Jan. 25, 1944. J. T. OBECNY 2,339,800
HYDRAULIC WORK HOLDER
Filed Aug. 4, 1941 3 Sheets-Sheet 3
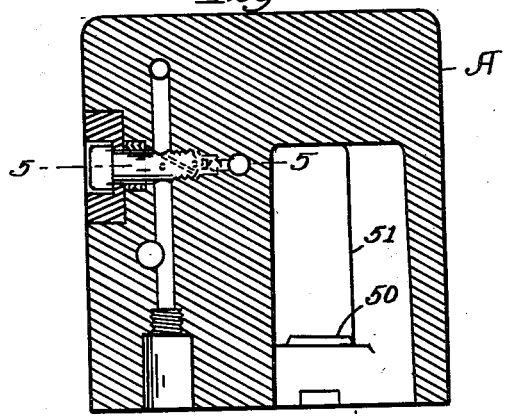
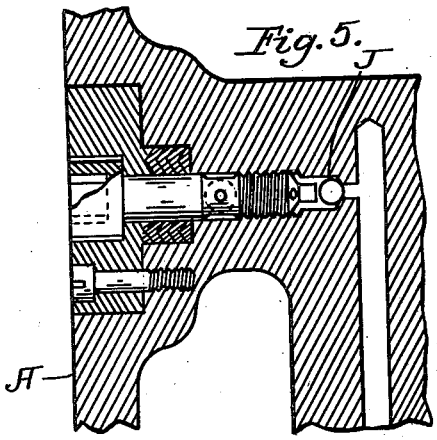
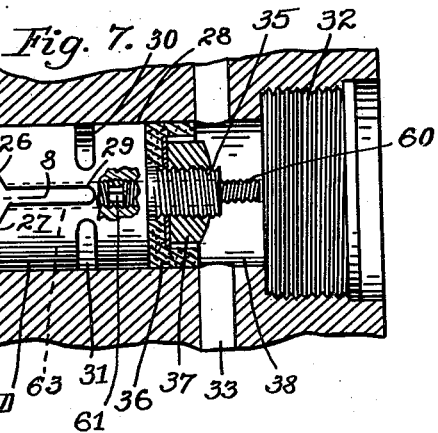
INVENTOR.
John T. Obecny,
BY
Attorney.

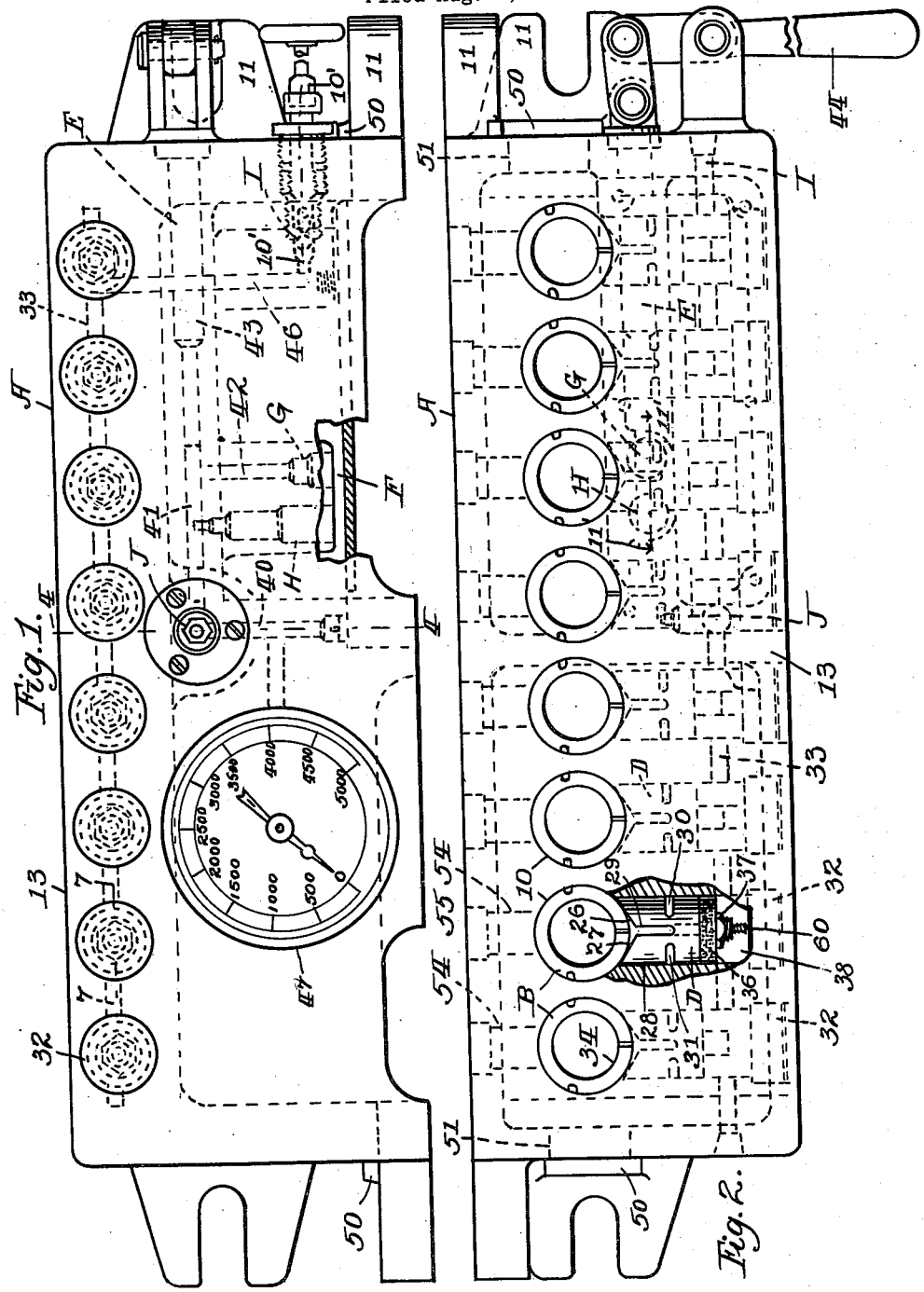

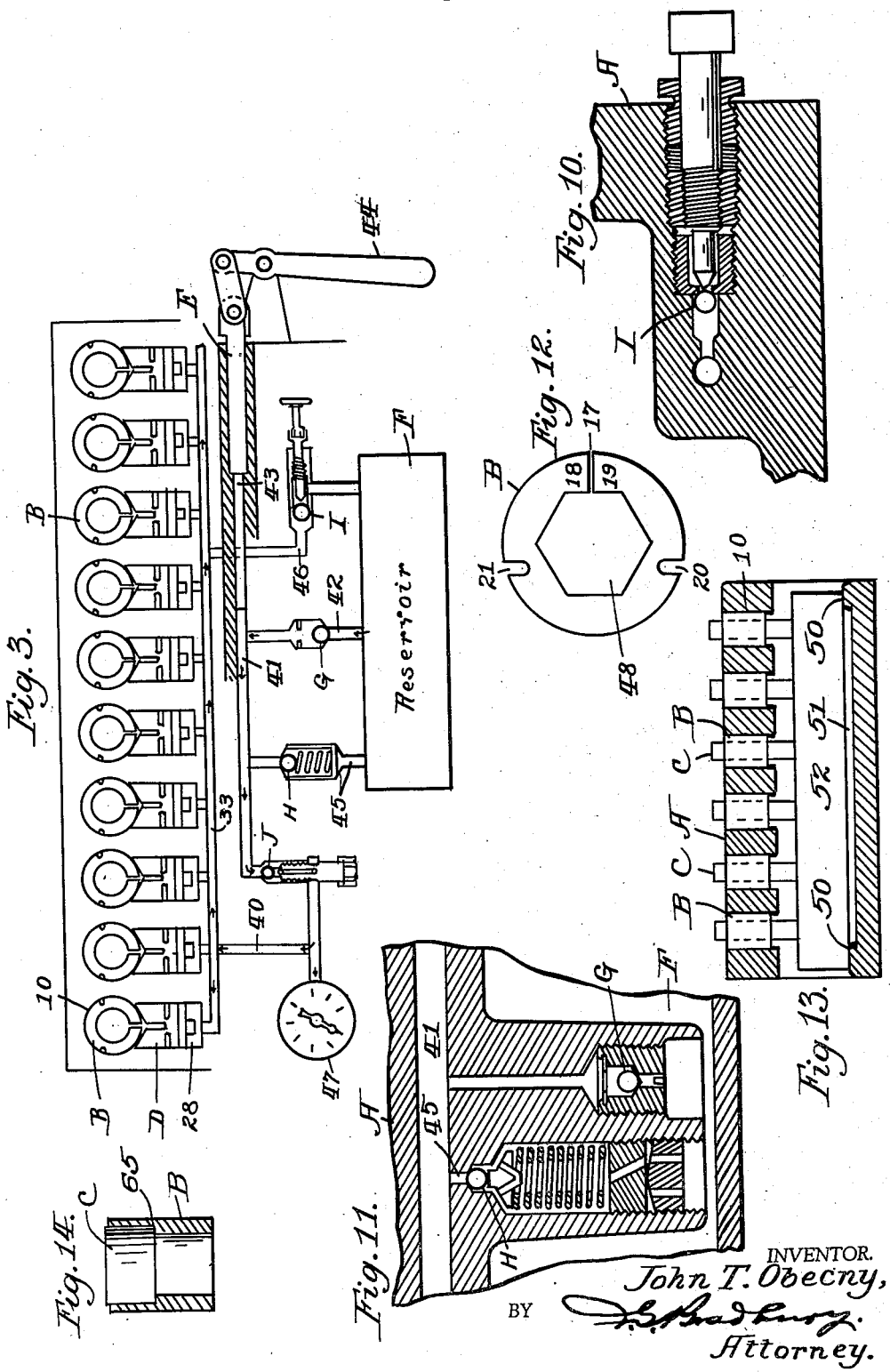
Jan. 25, 1944. J. T. OBECNY 2,339,800
HYDRAULIC WORK HOLDER
Filed Aug. 4, 1941 3 Sheets-Sheet 2
INVENTOR.
John T. Obecny,
BY
Attorney.

Patented Jan. 25, 1944

2,339,800

UNITED STATES PATENT OFFICE 2,339,800

HYDRAULIC WORK HOLDER

John T. Obecny, Los Angeles, Calif., assignor of one-half to Morrison C. Garst, Beverly Hills, Calif.

Application August 4, 1941, Serial No. 405,319

24 Claims. (Cl. 90—59)

My invention relates to hydraulic work holders for gripping and sustaining articles to be fabricated, machined, altered, marked or otherwise worked in any manner. This application is a continuation in part of my companion application filed August 28, 1940, Serial Number 354,597. The present invention, as in said prior application, employs a plurality of contractable spring collets, which are held in chuck openings and arranged in alignment, and a gang of actuating elements adapted to contract the collets so as to grasp and hold individual work articles or release them, all of said actuating elements being operable to contract a plurality of the collets evenly and simultaneously. The present invention among other novel features in addition to those disclosed in my former application provides improved means whereby the work articles are held firmly in more perfect alignment so that greater precision and accuracy are attained in milling, planing, grinding or otherwise treating the work articles which are held by the collets. The present improvement is of material assistance in mass production work with greater precision than heretofore, a row of articles constituting the work pieces being capable of being finished exactly alike with a tolerance of only a fractional part of one thousandth of an inch.

An object of the invention is to grip and hold a plurality of work pieces by suitable pressure which is distributed evenly throughout the several elements whereby no single work article is permitted to move or slip the slightest degree while being worked by a machine tool or in any manner. A further object is to cause each collet and actuator therefor, to function without disturbing the alignment or spacing of any of the remaining collets of a series in the work holder. Another object is to incorporate into a unit a plurality of my improved collets and chucks including actuating means therefor, which can be applied to various machine tools at any angle and in any manner for conducting accurate operations during machining and manufacture, with greater facility, speed, security, accuracy, strength and effectiveness and at reduced expense.

With the above objects and advantages in view and in addition to and including the objects and advantages set forth in my companion application, my invention comprises the features of construction and combination of parts hereinafter described and claimed.

In the accompanying drawings, forming part of this specification, Fig. 1 is a front elevational view of my improved work holder; Fig. 2 is a plan of the structure shown in Fig. 1, a portion of the body being broken away to illustrate more clearly one of the collets and its actuating plunger; Fig. 3 is a diagram illustrating my improved work holder, illustrating particularly the operation of the work holding collets and the cooperating hydraulic actuators by which the work holders are caused to function together; Fig. 4 is a section taken on the line 4—4 of Fig. 1; Fig. 5 is a section of a detail taken on line 5—5 of Fig. 4, showing the hand operated shut off valve in greater detail; Fig. 6 is an end elevation of the structure shown in Figs. 1 and 2; Fig. 7 is a section of a detail taken on line 7—7 of Fig. 1, showing the construction of one of the collets and its actuating plunger; Fig. 8 is a section taken on line 8—8 of Fig. 7; Fig. 9 is a perspective view of one of the collet holding pins; Fig. 10 is a section of a detail taken on line 10'—10' of Fig. 1, showing the hand operable fluid pressure release valve employed in the fluid pressure pump line system; Fig. 11 is a vertical section taken approximately on line 11'—11' of Fig. 2, showing the automatic fluid pressure release valve and the fluid compression check valve; Fig. 12 is a plan of an alternative construction of collet illustrating one of many variations of my improved collet by which work articles of many designs may be held by slight changes of the socket therein; Fig. 13 is a diagrammatic view illustrating the application of the parallel bar in the body of the device for gauging the work pieces in the collets at even height, and Fig. 14 is a section of a detail showing a modifictaion of the collet for supporting shallow work.

My improved work holder has incorporated into a single organization within a suitable body or housing A, a plurality of work holding collets B, which are sustained in suitable chuck openings or sockets 10. The body A is rectangular and is provided with suitable horizontal and vertical bosses 11 by which it is bolted or clamped on the bed or other support of a milling machine, shaper, planer or other machine tool, with work pieces such as C (Fig. 8), having stems 12 or other supporting means clamped securely by the collets therein. The collets are arranged in a row in the body A so that the work pieces are held in exact alignment, whereby a number of them can be machined or worked with a maximum of precision, which by the use of my improved holder has a tolerance less than 1000ths of an inch. The body A also contains suitable actuating means for causing all of the collets to function evenly and simultaneously. Therefore, the entire device can be quickly and accurately applied or adjusted in use. Further, as many work holding collets can be incorporated and arranged in the device as desired, thus facilitating the fabrication of a large number of work articles with extreme accuracy, at reduced cost and with a minimum of time.

The chucks or sockets 10 are of cylindrical bore and extend downwardly in the upper face 13 of the body A. Their axes are vertical, parallel to each other and lie in a vertical plane. The lower ends of the chucks terminate at even depth with inwardly projecting annular shoulders 14 having central passages 15, the former serving to support the collets B at even depth in the body and the latter admitting the supporting stems 12 of any length on the work piece C, freely downwardly. The body portion 16 of the work piece is adapted to rest upon and to be supported by the upper end of the companion collet.

Each collet for clamping the work piece by its supporting stem, resembles a hollow cylinder split down its side, leaving a narrow vertical gap 17 between the adjacent ends of circumferential arms 18 and 19. The collet is preferably made with a thick wall out of resilient material such as spring steel, said wall being weakened to promote resiliency by a pair of opposite longitudinal channels 20 and 21. These channels enable the arms 18 and 19 to be more easily sprung inwardly with their ends approaching or together to clamp and hold the work piece and also serve to provide shoulders against which the ends of pins 22 seated in the body engage and hold the collet against revolution in its chuck opening. All of the collets face with their gaps 17 directly forwardly, each collet and its gap lying in the plane of the longitudinal axis of an actuating reciprocable plunger D. Normally each collet is retained seated in a chuck opening by an expansion split ring 23 seated in annular shallow channels 24 and 25, respectively in the outer surface near the lower end of the collet and in the side wall of the lower end of the chuck. Thus by application of sufficient lifting force the collet can be extracted from the chuck and either reinserted or replaced by a collet having a bore of different size or cross sectional shape. Each cylindrical collet acts as a contractable collar seated in its chuck opening in the body to clamp and hold the work piece rigidly in position to be worked by a machine tool, when the body is fastened in place. All of the collets are aligned in the body so that all of the work articles can be finished true to size within a high degree of tolerance. The device can be made to accommodate any desired number of work elements.

The resilient arms 18 and 19 of each collet are contracted by the force of a plunger D which has a pair of inwardly beveled end faces 26 and 27 bearing against the outer curved faces of the arms. There is a cylindrical plunger D for each collet, the axis of which being arranged at right angles to the axis of the companion collet and all of the plungers being assembled in a longitudinal row. Each plunger reciprocates in a cylindrical bore 28 in the body A and its bearing surfaces 26 and 27 are adapted to guide against the opposite arms 18 and 19 and contract the collet when thrust thereagainst. Upon relief of the thrust effort the resiliency of the arms causes the reverse movement of the plunger and the arms expand into normal position thus releasing any work article therein.

The plunger D is fitted comparatively loosely in the cylindrical bore 28 to provide free action and is weakened by the end slot 29 and a pair of transverse slots 30 and 31. These slots increase the resiliency of the plunger and equalize the pressure exerted by the faces 26 and 27 against the arms of the collet so that a more effective guiding contact and wedging action is provided between the members of the plunger and collet to prevent binding and sticking of the plunger.

The cylindrical passages forming the bores 28 for the plungers D extend outwardly through the face of the body A and are closed by the threaded plugs 32, thus forming compression chambers 38 which are interconnected by the manifold duct 33 in the body to provide even distribution of the compression fluid and even holding tendency by the work holding elements. The inner contour of each collet is circular in cross section to provide a cylindrical passage 34 in which the stem 12 of the work piece is clamped. Each plunger has a threaded stud 35 on its inner end in the compression chamber 38, over which a suitable packing 36 is secured by the compression nut 37 so as to produce a leak proof sliding connection between the plunger and the inner wall of the compression chamber.

The actuating means which is incorporated into the body of the work holder is of fluid type, the propelling medium employed being oil or other suitable fluid, which is compressed by the hand operated hydraulic compression pump E. It is also contemplated that the pump may be motor driven and controlled by hand when desired. The circuit of the propelling medium is illustrated diagrammatically in Fig. 3 and enters into the novelty of the present invention to the extent of providing one form of suitable actuating means for propelling the plunger forwardly, holding the collets contracted for a period sufficient to machine or otherwise work the articles which are held by the device, and for releasing the collets from clamping the work articles at the will of the operator. In the system thus provided the cylindrical chambers in which the plungers D reciprocate are connected by the manifold supply passage 33, which in turn is connected to chamber 41 of the pump by a duct 40. F indicates a fluid reservoir contained in the body A, which is connected by duct 42 with the pump compression chamber, a suitable compression check valve G being interposed, whereby during the suction stroke of the piston 43, liquid is drawn into the pump chamber. Immediately upon compression by the piston valve G closes automatically and the fluid thus admitted is forced into the actuating chambers 38 back of the plungers D. These plungers compress and hold the collets tightly upon the work pieces. Continued operation of pump E by reciprocating the handle 44, increases the compression of the operating fluid until the desired pressure is reached, whereupon an automatic release valve H by-passes the compression fluid back into the reservoir through the by-pass duct 45. The release valve H thus functions as a safety valve to prevent danger and damage to the equipment from excessive pressure and also undesirable pressure upon the work articles which are held by the collets. To release the plungers a hand operated pressure release valve I is provided in a return duct 46, which is connected with the manifold passage 33 and the reservoir. By opening this valve the compressed fluid in the plunger chambers is allowed to return to the reservoir and the collets thereupon expand, thus releasing the work pieces and forcing all of the plungers D back under wedging action into normal position. During the operation of the actuating means an indicator 47 displays the pressure exerted by the actuating fluid in the system. Should it be desired to positively close the duct 40 entering the manifold to check any leakage through valves G and H, an auxiliary hand operable valve J is provided in duct 40.

The construction of each of the valves mentioned above is illustrated in detail in the following views, Fig. 10 showing the hand operable pressure release valve I; Fig. 11, the compression check valve G and the automatic release valve H, and Figs. 4 and 5 the auxiliary hand operable valve J. The positions of these valves in the body A are further indicated in Figs. 1 and 2.

Each of the plungers D is provided with an axially arranged adjustable threaded stop bolt 60 (Fig. 7), which normally is adjusted in the plunger against the stop 32, to limit the reciprocable movement of the plunger, to even the thrust movement of all of the plungers, and to maintain ample clearance between the faces 26 and 27 of the plungers and the arms of the companion collets. By this adjustment quicker and precisive response of the plungers against the collets is produced without lost motion or prolonged interval. The inner end of the adjusting bolt 60 is formed with a socket head 61 which can be engaged to turn and adjust the bolt through the passage 63 in the plunger and a coaxial passage 54 through the body, when the corresponding collet is removed. Normally the outer end of passage 54 is closed by a removable stopper 55. The device can be employed without this adjusting means when desired within the spirit of the invention.

The body portion of the work piece C has been described as being supported by the upper end of the collet. This may be the result when the work portion is larger than the stem 12 but it is contemplated to hold work pieces of various sizes and configurations and when the work piece is of such size and configuration as not to rest on the upper end of the collet provision can be made for gauging or supporting the work pieces at even predetermined height in body A. This supporting means consists of piers 50 formed in the opposite ends in the lower portion of a longitudinal passage 51 through the body upon which a lintel bar 52 is placed below the row of chuck openings. When the work pieces are placed in the collets the lintel bar is so placed their lower ends rest and are supported upon the bar at even height in the collets, in which position the collets are adapted to clamp and hold the work pieces at even height while they are being worked by the machine tool. The schematic view shown in Fig. 13 illustrates the application of this feature to the body of the work holder.

The socket openings in the collet elements B may be of any desired shape for holding work pieces in the body, the alternative construction appearing in Fig. 12 representing one of many other variations in which the opening 48 is of hexagonal shape instead of being cylindrical as described above.

The collets and their chuck openings have been shown and described as being arranged in an accurately aligned row and while this feature is of particular value in precision mass production work, the invention is not in any sense thus limited as it is contemplated that the collets and their chuck openings may be arranged in various positions in the body to apply machine tools most effectively. It is also contemplated that other work gripping means may be substituted in place of collets, in combination with other novel features of improvement contained in my invention, without departing from the spirit of the invention. When desired the collet may be constructed with a recessed work receiving opening forming an inner annular shoulder 65 for supporting shallow work pieces as shown in Fig. 14.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the spirit of the invention and within the scope of the following claims.

I claim:

1. A work holder, comprising, a supporting body, having a chuck opening, a work engaging collet held in said chuck opening and acting against spring tension for embracing and holding an article to be worked, said collet being slit longitudinally to provide contracting arms, and a reciprocable plunger in said body having end guide faces impressed against the sides of said arms and adapted by reciprocable movement of the plunger to contract the arms upon the article held by said collet.

2. A work holder, comprising, a supporting body, having a chuck opening, a work engaging collet held in said chuck opening and acting against spring tension for embracing and holding an article to be worked, said collet having contractible arms, and a reciprocable plunger in said body having inwardly beveled end faces directed against the arms of said collet adapted by the forward movement of the plunger to compress said arms and cause the collet to embrace and hold the work article and when released to permit the arms expanding into normal released position.

3. A work holder, comprising, a supporting body, having a chuck opening, a work piece engaging collet held in said chuck opening, said collet comprising a longitudinal split ring having a pair of contractible spring arm members acting against encircling spring tension to embrace and hold an article to be worked, and an actuating element having inner end diverging faces directed transversely against the free ends of said arms and adapted by the forward movement thereof to contract said arms upon and hold the work piece in the collet and to permit said arms expanding and releasing the work piece when said actuating element is reversed.

4. A work holder, comprising, a supporting body having a chuck opening, a collet held in said chuck opening having a pair of contractible arms acting against spring tension to contract and hold a work piece in the collet, an actuating plunger having a substantially V shaped notch in its inner end, the faces of which are directed against the outer faces of said pair of arms and adapted by the forward movement of the plunger to compress said arms upon and hold the work piece in the collet.

5. A work holder, comprising, a supporting body having a chuck opening, a collet held in said opening having a pair of encircling spring arm members acting against spring tension to contract and hold a work piece therein, an actuating element movable transversely in said body having a beveled face directed against the outer side surface of one of said arm members adapted by forward movement thereof to compress said arm and contract the collet and when released permitting the arm member expanding under spring effort into normal position whereby the work piece is released, and releasable means for projecting the actuating element into forward position.

6. A work holder, comprising, a supporting body having a chuck opening and means for fastening the body on a machine tool, a collet held in said chuck opening, means for engaging the collet and body to prevent the collet turning in said chuck opening, said collet being formed with a pair of laterally extending arm members contractible against spring tension to hold a work piece in stationary position on said body, a plunger reciprocable in said body having a pair of guide faces directed under a forward effort against the free ends of said arm members to contract the collet, means for propelling the plunger against said arms, and means for maintaining pressure delivered by the plunger against said arms.

7. A work holder, comprising, a supporting body having a series of aligned chuck openings, a series of collets held in alignment within the chuck openings, each of said collets resembling a hollow cylinder having a longitudinal slit forming a pair of arms separated by a gap to allow contraction of the collet for embracing and holding a work piece, a plurality of plungers reciprocable in said body, one plunger being arranged for each collet with its end abutting both of the arms thereof to contract the same when thrust forwardly and means for thrusting all of said plungers forwardly simultaneously and holding the arms of said collets tightly compressed.

8. A work holder, comprising, a supporting body having a chuck opening, a work engaging collet held in said chuck opening and acting against spring tension for embracing and holding an article to be worked, said collet having contractible arms, and a reciprocable plunger in said body having inwardly beveled end faces directed against the arms of said collet adapted by the forward movement of the plunger to compress said arms and cause the collet to embrace and hold the work article and when released to permit the arms expanding into normal released position, and an adjustable element carried by said plunger for regulating the stroke thereof.

9. A work holder, comprising, a supporting body having a series of aligned chuck openings, a series of collets held in alignment within the chuck openings, each of said collets resembling a hollow cylinder having a longitudinal slit forming a pair of arms separated by a gap to allow contraction of the collet for embracing and holding a work piece, a plurality of plungers reciprocable in said body, one plunger being arranged for each collet with its end abutting both of the arms thereof to contact the same when thrust forwardly, means for thrusting all of said plungers forwardly simultaneously and holding the arms of said collets tightly compressed upon the work pieces, and means for adjusting the stroke of each of said plungers whereby the action of the plungers against the collets and the gripping of the work pieces by the collets are equalized.

10. A work holder, comprising, a body having a chuck opening, a work article holding collar seated in said opening formed with separated resilient compression members, a reciprocable plunger seated in said body having a guide end adapted by the forward movement thereof to compress one of said compression members and cause the collar to hold the work article rigidly therein and actuating means for thrusting said plunger from normal position against said compression member, said collar functioning under spring tension to return the plunger into normal position when the actuating means is released.

11. A work holder, comprising, a body having a series of chuck openings extending outwardly, work article holding collars seated in said openings, each collar being formed with separated annular compression members, a plurality of reciprocable plungers disposed transversely to said collars and seated in said body, one plunger for each collar having a guide and adapted by the forward movement thereof to compress one of said compression members of a companion collar and cause the collar to hold the work article rigidly upon said body, and actuating means interconnected with said plungers for thrusting all of said plungers simultaneously from normal position against the compression members of said collars and holding the collars tightly compressed upon the work pieces held thereby, said collars functioning under spring tension to return all of the plungers into normal position when the actuating means is released.

12. A work holder, comprising, a body having a series of chuck openings therein, a series of work holding collars seated in said openings, each collar having a contractible arm member by the compression of which a work piece is adapted to be held rigidly therein, thrust members slidable in said body transverse to said collars and having guide surfaces adapted to compress said arms by the forward movement of said thrust members and retain said collars compressed, and means for urging said thrust members forwardly from normal position against said collars to hold work pieces therein, said collars when released being adapted to return the thrust pieces into normal position.

13. A work holder, comprising, a body having a chuck opening therein, a work article holding collar coaxially secured in said opening and formed with a pair of laterally separated resilient work piece embracing members, a cylindrical compression chamber disposed axially transverse to said chuck opening and the collar therein, a plunger reciprocable in said compression chamber and having its forward end impressed against said embracing members to contract the latter and hold a work piece rigidly in said collar, and actuating means associated with said fluid compression chamber to urge the plunger forwardly and contract said embracing members upon the work piece in said collar.

14. A work holder, comprising, a body having a horizontal series of chuck openings therein, a series of work piece holding split collars seated in said openings, each collar being contractible to embrace and hold a work piece, laterally reciprocable actuating means for contracting and retaining said collars compressed, and a lintel removably seated in said body below said chuck openings for supporting the work pieces at selective even height in said collets previous to the application of the actuating means for compressing said collars and rigidly holding the work pieces therein.

15. A hydraulic work holder including in combination: a body having therein a series of openings to receive collets, a corresponding series of collets seated therein for holding work piece, a series of pressure elements hydraulically operable for compressing said collets upon work pieces therein, hydraulic means for simultaneously operating said pressure elements upon said collets, said hydraulic means being common to all of said pressure elements, whereby the pressure is equalized on all of said collets, and manually operable means for controlling said hydraulic means.

16. In a holder for a plurality of work pieces, the combination of a body having a plurality of collet seats, a contractible collet mounted in each seat to prevent displacement and having a socket for receiving a work piece, a plunger corresponding with each collet and guided to move toward and against the wall of the collet along a line substantially transverse to the longitudinal axis of the collet, each collet and its corresponding plunger having engaging faces cooperating to contract the collet and clamp its corresponding work piece, and hydraulic means for advancing the plungers in unison.

17. In a holder for a plurality of work pieces, the combination of a body having a plurality of collet seats, a contractible collet mounted in each seat and having a socket for receiving a work piece, cooperating engaging means between each seat and the corresponding collet to prevent displacement of the collet, a plunger corresponding with each collet and guided against the side of the collet along a line substantially transverse to the longitudinal axis of the collet, each collet and its corresponding plunger having engaging faces cooperating to contract the collect and clamp its corresponding work piece, and actuating means for advancing the plungers in unison.

18. In a holder for a plurality of work pieces, the combination of a body having a plurality of collet seats therein, a collet mounted in each seat and having a socket for receiving a work piece and a resilient contractible member for embracing said work piece, cooperating engaging means between each seat and the collet therein to prevent displacement of the collet in its seat, a thrust element corresponding with each collet and guided to impress the resilient contractible member thereof along a line substantially normal to the longitudinal axis of the collet, and actuating means for advancing the thrust elements in unison and retaining the work pieces rigidly by the collets.

19. In a holder for a plurality of work pieces, the combination of a body having a plurality of collet seats therein, a split hollow cylindrical collet mounted on end in each seat providing a socket for receiving a work piece and a resilient contractible arm for clamping a work piece, cooperating engaging means between each seat and the collet therein for preventing rotation of the collet in its seat, a plunger corresponding with each collet and guided in said body to impress said resilient contractible arm along a line substantially normal to the axis of the collet, and hydraulic means for advancing the plungers in unison.

20. A work holder, comprising, a supporting body having a collet seat, a contractible collet mounted in said seat and acting against spring tension for embracing and holding a work piece, said collet being slit longitudinally to provide restraining arms, and a reciprocable plunger corresponding to said collet having end guide faces adapted by the reciprocable movement of the plunger to contract said arms upon the work piece held by said collet.

21. A work holder, comprising, a supporting body, having a collet seat, a work engaging collet held in said seat and acting against spring tension for embracing and holding a work piece, said collet having contractible arms, and a reciprocable plunger corresponding to said collet and having inwardly beveled end faces directed against the arms of the collet and adapted by advancing the plunger to compress said arms and cause the collet to engage the work piece and when released permitting the arms to expand into normal released position.

22. A work holder, comprising, a supporting body having a collet seat, a work engaging collet held in said seat and acting against spring tension for embracing and holding a work piece, said collet having a contractible arm, and a reciprocable plunger corresponding to said collet and having a forwardly inclined face directed against said contractible arm and adapted by advancing the plunger to contract said arm and cause the collet to engage the work piece.

23. A work holder, comprising, a supporting body having a collet seat, a work piece engaging collet held in said collet seat, said collet having a socket for receiving a work piece and being split longitudinally to provide a pair of arms, one of which is contractible, and a reciprocable plunger having a forwardly inclined face directed against the side of said contractible arm to clamp the work piece in the collet when the plunger is advanced, and releasing said contractible arm when the plunger is retracted.

24. A work holder, comprising, a supporting body having a collet seat, a collet mounted in said seat and having a socket and contractible embracing arms for receiving and clamping a work piece, an actuating element movable transversely to the axis of the collet and having its forward end directed against the side of one of said arms, one of said embracing arms and the forward end of said actuating element having engaging divergent faces cooperating to contract the collet and clamp its work piece when the actuating element is advanced, and means for reciprocating said actuating element.

JOHN T. OBECNY.